United States Patent
Batarseh et al.

(10) Patent No.: US 6,819,575 B1
(45) Date of Patent: Nov. 16, 2004

(54) AC/DC SWITCH MODE POWER SUPPLY WITH POWER FACTOR CORRECTION USING DIRECT ENERGY TRANSFER CONCEPT

(75) Inventors: Issa Batarseh, Oviedo, FL (US); Peter Kornetzky, Ilmenau (DE); Shiguo Luo, Dallas, TX (US); Weihong Qiu, Orlando, FL (US)

(73) Assignee: University of Central Florida, Orlando, FL (US)

( * ) Notice: Subject to any disclaimer, the term of this patent is extended or adjusted under 35 U.S.C. 154(b) by 71 days.

(21) Appl. No.: 10/202,794

(22) Filed: Jul. 25, 2002

Related U.S. Application Data
(60) Provisional application No. 60/308,772, filed on Jul. 30, 2001.

(51) Int. Cl.[7] ............................................. H02M 3/335
(52) U.S. Cl. ............................... 363/21.12; 363/21.01; 363/21.04
(58) Field of Search .......................... 363/16, 20, 21.01, 363/21.04, 21.12, 89, 97, 125, 131; 323/222

(56) References Cited

U.S. PATENT DOCUMENTS

| | | | |
|---|---|---|---|
| 5,404,092 A | * 4/1995 | Gegner | 323/207 |
| 5,434,767 A | 7/1995 | Betarseh et al. | 363/16 |
| 5,508,903 A | 4/1996 | Alexndrov | 363/16 |
| 5,636,106 A | 6/1997 | Batarseh et al. | 363/16 |
| 5,734,562 A | * 3/1998 | Redl | 363/16 |
| 5,844,787 A | 12/1998 | Fraidlin et al. | 363/21 |
| 5,903,446 A | 5/1999 | Huillet et al. | 363/17 |
| 5,946,201 A | 8/1999 | Kim | 363/21 |
| 5,991,172 A | * 11/1999 | Jovanovic et al. | 363/21.14 |
| 6,044,002 A | 3/2000 | Van Der Wal et al. | 363/97 |
| 6,046,914 A | 4/2000 | Lauter | 363/37 |
| 6,097,614 A | 8/2000 | Jain et al. | 363/16 |
| 6,266,256 B1 | 7/2001 | Lehnert et al. | 363/37 |

* cited by examiner

*Primary Examiner*—Michael Sherry
*Assistant Examiner*—Gary L. Laxton
(74) *Attorney, Agent, or Firm*—Brian S. Steinberger; Law Offices of Brian S. Steinberger, P.A.

(57) ABSTRACT

Power Factor Correction (PFC) "flyboost" cell, with a transformer having primary winding connected to input power and secondary winding connected to output rectifier, which has both functions of a flyback transformer and boost inductor. Combining the flyboost cell with DC/DC conversion cells, forms a single-stage PFC converters. Both cells share one main switch and one controller. Letting the flyboost cell operate at Discontinuous Conduction Mode, requires a simple control for high power factor. Through flyboost cell, part of output power is processed once by main switch, and is referred to as direct power transfer (DPT), which will significantly improve efficiency. The flyboost cell will automatically limit the DC bus voltage through flyboost transformer turn ratio. The converters are suitable for universal voltage applications.

17 Claims, 9 Drawing Sheets

AC/DC SWITCH MODE POWER SUPPLY WITH POWER FACTOR CORRECTION USING DIRECT ENERGY TRANSFER CONCEPT

This application claims the benefit of the priority of U.S. Provisional Application Ser. No. 60/308,772 filed Jul. 30, 2001.

FIELD OF THE INVENTION

The invention relates to single stage power factor correction (PFC) converters and in particular, the invention relates to a single stage PFC converter, in which some energy is transferred directly from the rectifier output to the converter output.

BACKGROUND AND PRIOR ART

There are a number of standards which specify the requirement of the line current harmonics of electronic equipment. In order to meet those standards, the active power factor correction circuit is demanded.

The typical prior art approaches for meeting these harmonic standards are set forth in the patent literature as follows:

U.S. Pat. No. 5,434,767 to Batarseh, et al.; U.S. Pat. No. 5,636,106 to Batarseh, et al.; U.S. Pat. No. 5,844,787 to Fraidlin, et al.; U.S. Pat. No. 6,266,256 to Lehnert, et al.; and, U.S. Pat. No. 6,044,002 to Van Der Wal, et al. are each without an additional winding connected to the rectified input side and not arranged to transfer to the output directly during the time when the line voltage exceeds a preset value.

Also of background interest are: U.S. Pat. No. 5,508,903 to Alexandrov, et al.; U.S. Pat. No. 5,903,446 to Huillet, et al.; and, U.S. Pat. No. 6,097,614 to Jain, et al. although each of the three is to a DC/DC converter (not for a PFC AC/DC converter); and, finally U.S. Pat. No. 6,046,914 to Lauter uses an additional winding connected with the boost inductor as a voltage feedback sensor to alleviate the voltage across the bulk capacitor.

It appears from the prior art teachings known to the inventors that the present approach for meeting the standard requirements of the line current in low cost and low power applications is the common scheme of a single stage power factor correction circuit. The typical characteristics of such single stage PFC schemes include:

1) Combining a power factor correction (PFC) cell with an isolated DC/DC conversion cell; and, 2) Two PFC cells share one main power switch and one simple controller.

The typical prior schemes suffer from high direct current (DC) bus voltage stress, low efficiency and/or high output ripple, since all energy is firstly transferred from line source to DC bus storage capacitors by PFC cell, and then transferred to the load by a direct current to direct current (DC/DC) conversion cell.

SUMMARY OF THE INVENTION

It is the object of this invention to provide an improved single stage PFC scheme.

It is a further object of this invention to provide an improved single stage PFC scheme with higher efficiency.

It is another object of this invention to provide an improved single stage PFC scheme with active DC bus voltage control.

According to the invention, there is a power factor correction alternating current to direct current (AC/DC) converter comprising: a power factor correction cell having two AC input terminals, a transformer, a switch and two DC output terminals; a DC-DC converter cell having two DC input terminals, inductor, transformer, switch and DC output terminals; a duty cycle controller having an output voltage sense and pulse width modulation cell; and, means for transferring a portion of the power from said PFC cell directly to its output.

Other features, objects and advantages of the invention will become apparent from the following detailed description when read in connection with the accompanying drawings.

BRIEF DESCRIPTION OF DRAWINGS

Details of the invention, and of preferred embodiments thereof, will be further understood upon reference to the drawings, wherein.

DESCRIPTION OF THE PREFERRED EMBODIMENT

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

In this invention, a new Power Factor Correction (PFC) cell, to be called "flyboost" cell, is used instead of, i.e., replaces, the boost cell in a conventional PFC scheme. The flyboost cell includes a transformer having a primary winding connected to the input power and a secondary winding connected to output rectifier, so it has both functions of the well known flyback transformer and boost inductor. By combining the flyboost cell and any family of other DC/DC conversion cell, one can obtain a new family of single-stage PFC converters. Both PFC and DC/DC cells can share one main switch and one controller.

According to instantaneous input voltage, the flyboost cell will operate under two different modes: the boost mode for high instantaneous voltage; and, the flyback mode for low instantaneous voltage. While operating in the flyback mode, the flyboost cell will directly transfer input power from the rectifier stage to the load. In the boost mode, it will transfer input power to the DC bus storage capacitors in the DC/DC conversion stage.

By letting it operate at Discontinuous Conduction Mode (DCM), only a simple control will be required to achieve a very high power factor (greater than 0.98). By using flyboost cell, a portion of input power is processed only once by the main switch. This feature will significantly improve the efficiency. Another important characteristic of the flyboost cell is that it will automatically limit the DC bus voltage through the flyboost transformer by a properly designed turn ratio, which means that the DC/DC cell can operate either in the DCM or in the Continuous Conduction Mode (CCM) while still keeping simple control circuitry. Under CCM, the current stresses on power components will be reduced, resulting in improved efficiency. Conventional schemes cannot let the DC/DC cell operate under CCM, because of high bus voltage problems and increased failure of its components. As a result, the proposed converters are especially suitable for universal voltage applications.

Figure 1:
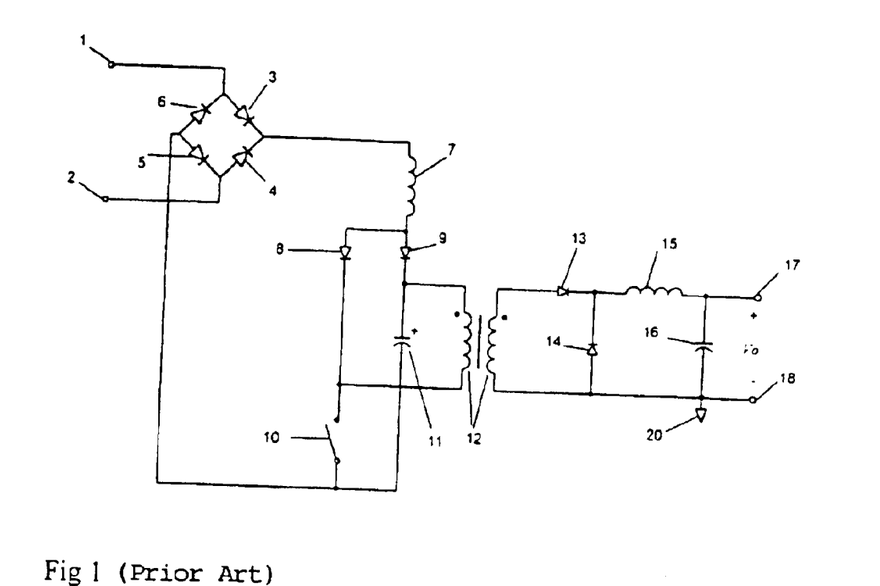
FIG. 1 shows the Prior art.

As earlier noted, FIG. 1 is a schematic diagram which represents the prior art embodiments. It combines one boost cell with one forward DC/DC conversion cell. Both cells share one switch. Boost cell includes input terminals 1 and 2, rectifiers 3, 4, 5 and 6, inductor 7, diodes 8 and 9, switch 10 and bus capacitor 11. The DC/DC conversion cell consists of transformer 12, output diodes 13 and 14, inductor 15, capacitors 11 and 16, switch 10, output terminals 17 and 18, and output ground 20 connected with terminal 18. Both cells share the switch 10 and bus capacitor 11.

Figure 2:
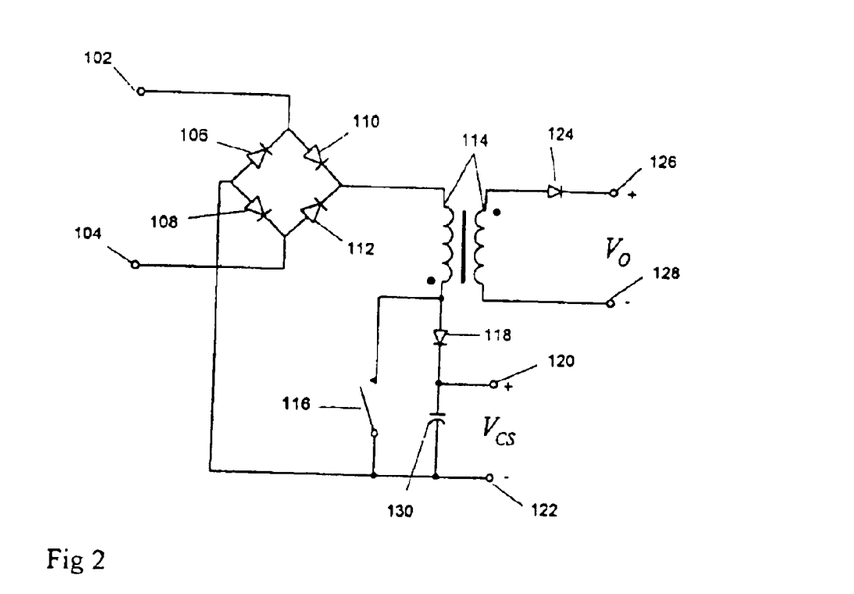
FIG. 2 shows a Flyboost cell.

Refer now to FIG. 2. which is the schematic diagram of a Flyboost PFC cell. It includes input terminals 102 and 104, input rectifiers 106, 108, 110 and 112, transformer 114, diodes 124 and 118, DC bus storage capacitor 130, the main switch 116, output terminals 126 and 128, and bus voltage terminals 120 and 122. In this flyboost cell shown in FIG. 2, a flyback/boost transformer 114 is connected to the output of the full bridge rectifier which rectifies the line voltage to pulsed DC voltage. The primary winding of Flyback/boost transformer is also connected to a main switch 116 and to storage capacitor 130 through diode 118. The secondary winding of flyback/boost transformer flyback/boost transformer 114 is connected to the outputs 126 and 128 through diode 124. When switch 116 is ON, the current in primary winding of flyback/boost transformer 114 increases linearly from approximately 0 and energy is stored in the winding of flyback/boost transformer 114. When the switch 116 is OFF, the energy in the winding of flyback/boost transformer discharges through diode 118 to storage capacitor 130 or through diode 124 to output terminals 126 and 128.

The Discontinuous Conduction Mode (DCM) level operation of a conventional boost PFC cell is well known. By letting the boost cell run at DCM, the current in boost inductor 7 is charged from approximately 0 during switch ON interval, and discharged to approximately 0 during switch OFF interval. A very good power factor (higher than 0.97) is automatically achieved since the value of the average current is almost proportional to the instantaneous input voltage, if the duty cycle is constant. The DCM boost cell as currently used in active power factor corrector circuitry is characterized by inductor 7, no longer required by this invention.

In the practice of the invention, the flyboost PFC cell works also at DCM. The charging operation of the flyboost cell is exactly same as the boost PFC cell. But the discharging operation of flyboost cell is different from the conventional boost cell. The current in the flyboost transformer 114 will be charged from approximately 0 and discharged to approximately 0 in one switching cycle. The average current is also proportional to the instantaneous input voltage at constant duty cycle resulting in a good power factor. But there are two discharging paths, which will bring minimization of the output voltage ripple and other unique properties of this invention which becomes apparent upon further reading of this application.

By combining the flyboost PFC cell with the popular DC/DC converter cell, a family of single stage power factor correction converters is achieved. Some practical examples are shown in FIGS. 3a–3g. The flyboost PFC cell transfers some energy to output directly as well as transferring energy to the storage capacitor concurrent with the DC/DC converter cell transferring the required energy from storage capacitor to the output. Both cells share one main switch and one controller. The controller monitors the output voltage and keeps it constant by adjusting the duty cycle of main switch.

Figure 3A:
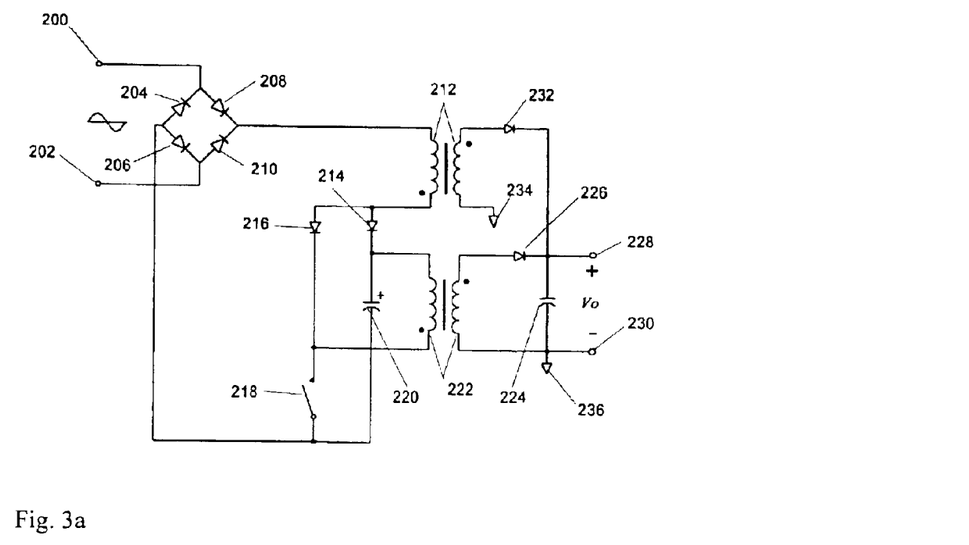
FIG. 3a is the diagram of the combination of flyboost cell with flyback DC/DC conversion cell.

In FIG. 3a, flyboost cell is integrated with flyback DC/DC cell. The flyboost cell includes: input voltage terminal 200 and 202, input rectifier 204, 206, 208 and 210, transformer 212, diodes 214 and 216, DC bus storage capacitor 220, the main switch 218, output ground 234 and output diode 232. The flyback conversion cell consists of output terminals 228 and 230, bus capacitor 220, switch 218, transformer 222, output diode 226, and output capacitor 224. The output ground 234 is connected with 236 and output terminal 230.

Figure 3B:
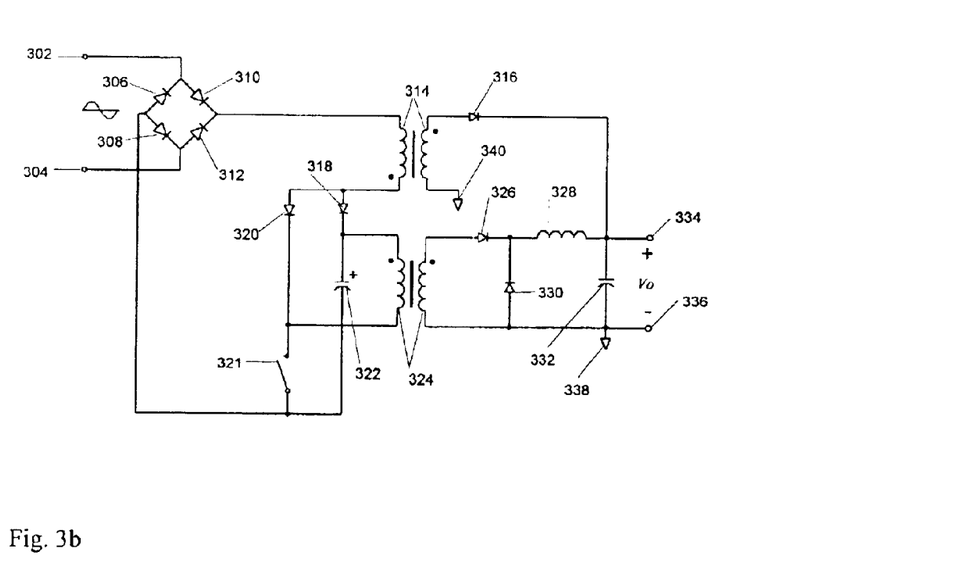
FIG. 3b is the diagram of an alternative combination of flyboost cell with forward DC/DC conversion cell.

In FIG. 3b, flyboost cell is integrated with forward DC/DC cell. The flyboost cell includes: input voltage terminal 302 and 304, input rectifier 306, 308, 310, and 312, transformer 314, diodes 318 and 320, DC bus storage capacitor 322, the main switch 321, output ground 340 and output diode 316. The forward conversion cell consists of output terminals 334 and 336, bus capacitor 322, switch 321, transformer 324, output diode 326 and 330, output inductor 328 and output capacitor 332. The output ground 338 is connected with 340 and output terminal 336.

Figure 3C:
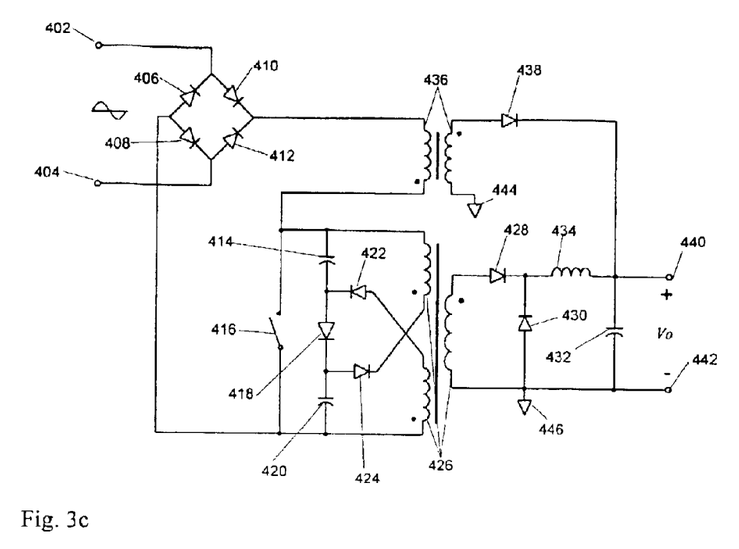
FIG. 3c is the diagram of the combination of flyboost cell with series/parallel forward DC/DC conversion cell.

In FIG. 3c, flyboost cell is integrated with parallel/series forward DC/DC cell. The flyboost cell includes: input voltage terminal 402 and 404, input rectifier 406, 408, 410, and 412, transformer 436, DC bus storage capacitors 414 and 420, the main switch 416, output ground 444, and diodes 438 and 418. The parallel/series forward conversion cell consists of output terminals 440 and 442, bus capacitors 414 and 420, switch 416, output diode 428 and 430, transformer 426, primary diodes 418, 422, and 424, output inductor 434 and output capacitor 432. The output ground 446 is connected with 444 and output terminal 442.

Figure 3D:
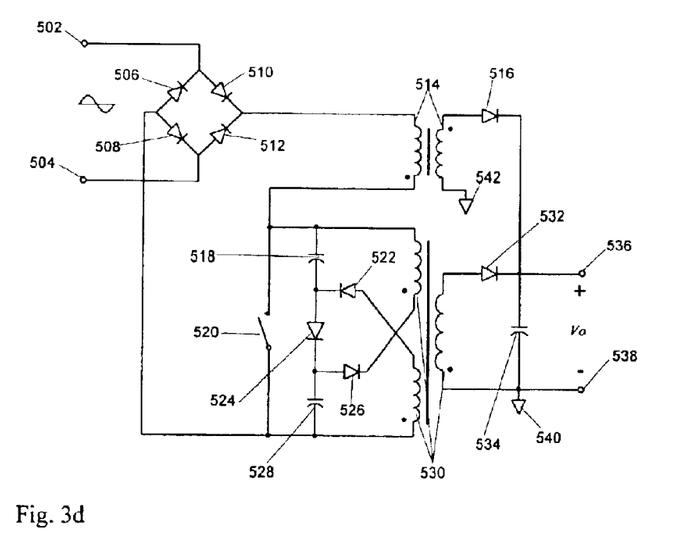
FIG. 3d is the diagram of the combination of flyboost cell with series/parallel flyback DC/DC conversion cell.

In FIG. 3d, flyboost cell is integrated with parallel/series flyback DC/DC cell. The flyboost cell includes: input voltage terminal 502 and 504, input rectifier 506, 508, 510, and 512, transformer 514, DC bus storage capacitors 518 and 528, the main switch 520, output ground 542, and diodes 524 and 516. The parallel/series flyback conversion cell consists of output terminals 536 and 538, bus capacitors 518 and 528, switch 520, output diode 532, transformer 530, primary diodes 522, 524, and 526, and output capacitor 534. The output ground 540 is connected with 542 and output terminal 538.

Figure 3E:
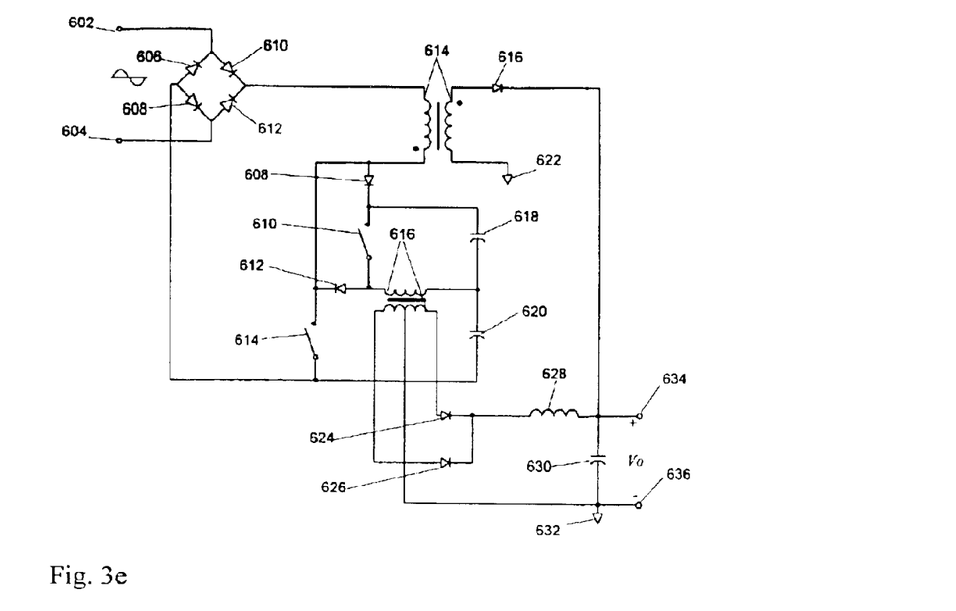
FIG. 3e is the diagram of the combination of flyboost cell with half bridge DC/DC conversion cell.

In FIG. 3e, flyboost cell is integrated with half bridge DC/DC cell. The flyboost cell includes: input voltage terminal 602 and 604, input rectifier 606, 608, 610, and 612, transformer 614, DC bus storage capacitors 618 and 620, main switch 614, output ground 622, and diodes 608, 612 and 616. The half bridge conversion cell consists of output terminals 636 and 634, bus capacitors 618 and 620, transformer 616, switches 610 and 614, output diodes 624 and 626, primary diode 612, output inductor 628 and output capacitor 630. The output ground 632 is connected with 622 and output terminal 636.

Figure 3F:
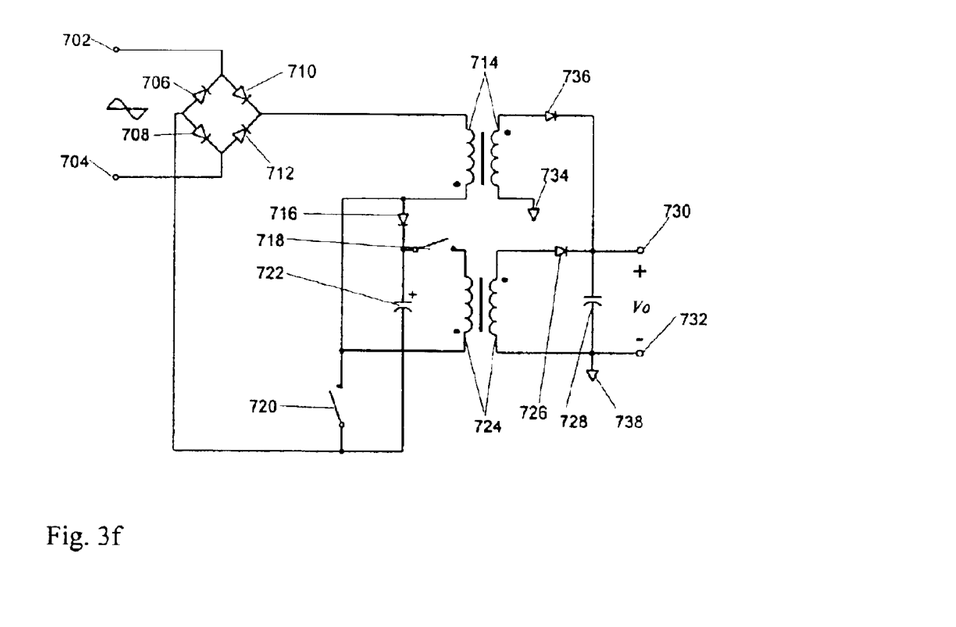
FIG. 3f is the diagram of the combination of flyboost cell with two-switch flyback DC/DC conversion cell.

In FIG. 3f, flyboost cell is integrated with two switches flyback DC/DC cell. The flyboost cell includes: input voltage terminal 702 and 704, input rectifier 706, 708, 710, and 712, transformer 714, DC bus storage capacitor 722, main switch 720, output ground 734, and diodes 736 and 716. The two switches conversion cell consists of output terminals 730 and 732, bus capacitor 722, transformer 724, switches 718 and 720, output diode 726, and output capacitor 728. The output ground 738 is connected with 734 and output terminal 732.

Figure 3G:
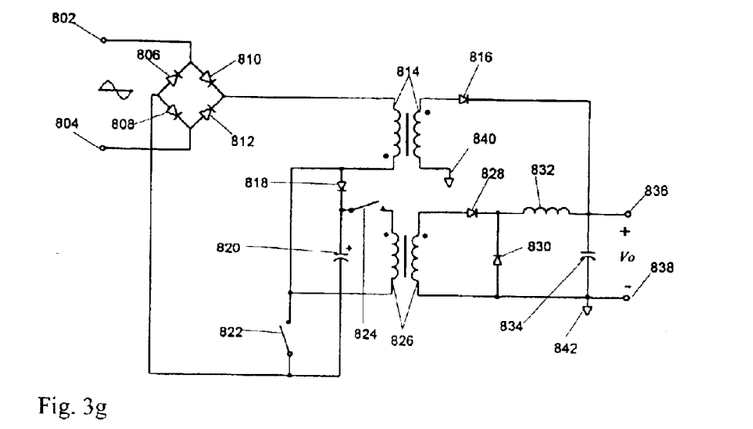
FIG. 3g is the diagram of the combination of flyboost cell with two switch forward DC/DC conversion cell.

In FIG. 3g, flyboost cell is integrated with two switches forward DC/DC cell. The flyboost cell includes: input voltage terminal 802 and 804, input rectifier 806, 808, 810, and 812, transformer 814, DC bus storage capacitor 820, main switch 822, output ground 840, and diodes 818, and 816. The two switches forward conversion cell consists of output terminals 836 and 838, bus capacitor 820, transformer 826, switches 824 and 822, output diodes 828 and 830, output inductor 832 and output capacitor 834. The output ground 842 is connected with 840 and output terminal 838.

Figure 4A:
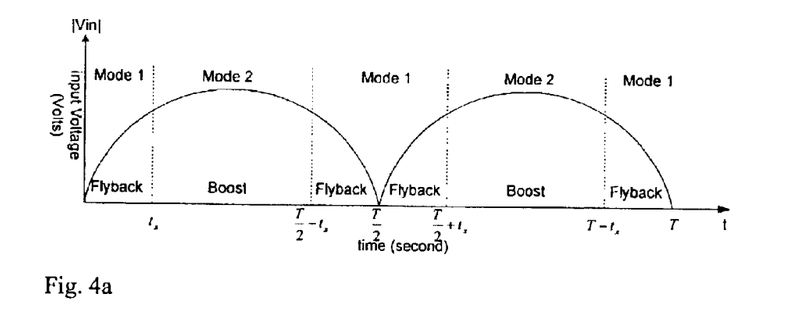
FIG. 4a shows the operation mode of the flyboost cell under different input voltage.

According to the discharge path, the operation of flyboost PFC cell is divided into two modes: flyback mode; and, boost mode, as shown in FIG. 4a. It also corresponds to different input voltage. When input voltage is low, the flyboost cell works at flyback mode and the energy is discharged to output directly, just like flyback converter; when input voltage is high, the flyboost cell will work at boost mode and energy will be discharged to storage capacitor, just like the operation of the boost converter.

Refer again to FIG. 3c where the converter consists of the flyboost cell with parallel/series forward converter cell. The operation modes and important waveforms of the instant converter are shown in FIGS. 4b and 4c.

When the line voltage is low, i.e., rectifier instantaneous input voltage ($|Vin(t)|$) plus output voltage (Vo) divided by turn ratio of flyboot transformer (n1) less than two times DC bus capacitor voltage (Vcs), the flyboost PFC cell works as flyback transformer. During the switch on period, the current in flyboost transformer will increase linearly and the energy is stored in the winding as magnetizing energy. During the switch off period, the stored magnetizing energy will be transferred to the load. Meanwhile, the parallel/series forward cell will deliver some power to load also in order to keep the total power of PFC cell and forward cell in one switching cycle equal to the output power, which will minimize the output voltage ripple. Operation waveform during this mode is shown in FIG. 4b.

Figure 4B:
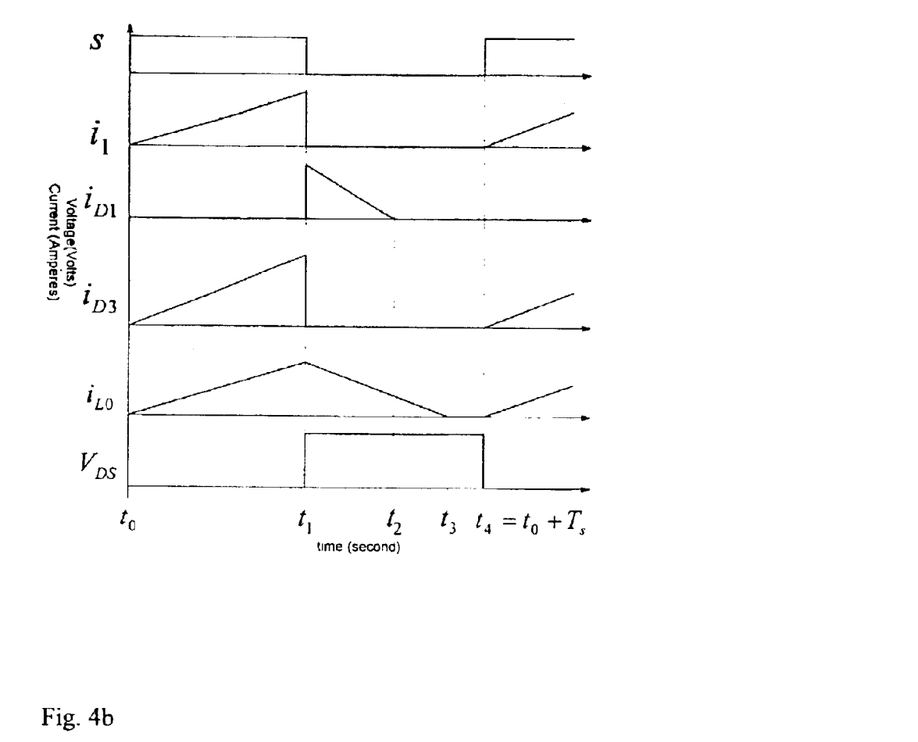
FIG. 4b shows the typical waveforms when flyboost is at flyback mode.
Figure 4C:
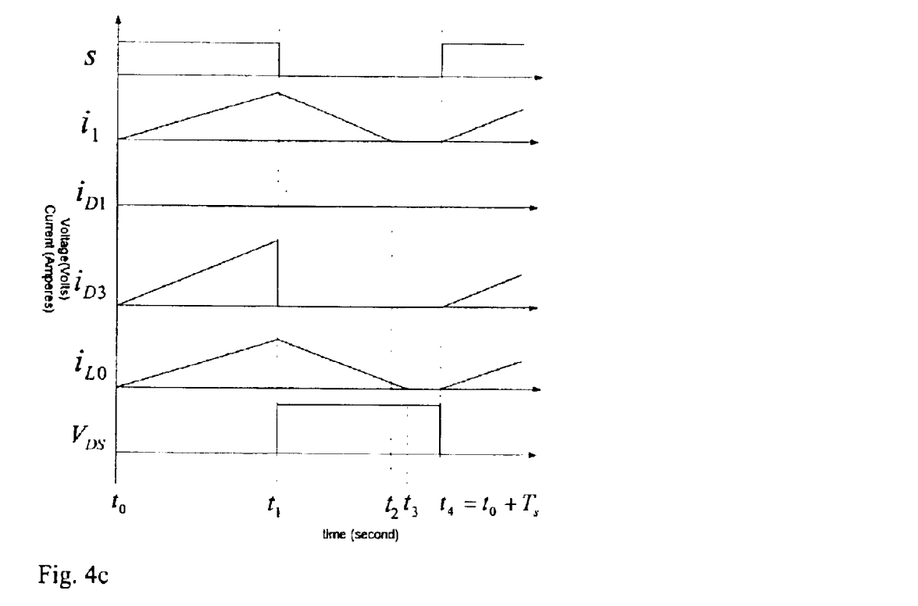
FIG. 4c shows the typical waveforms when flyboost is at boost mode.

In FIGS. 4b and 4c, S is the switch drive signal to switch 416, $i_1$ is the current through flyboost transformer 436, $i_{D1}$ is the current through diode 438, $i_{D3}$ is the current through diodes 422 and 424, $i_{Lo}$ is the current through inductor 434, and $V_{DS}$ is the voltage across the switch 416.

Period 1 ($t_o$~$t_1$): the main switch 416 is turned on at $t_o$, the line voltage is applied to the flyboost transformer 436. The current in the primary winding of the flyboost transformer, $i_1$ in FIG. 4b, will increase linearly with the energy stored in the flyboost transformer and the voltage across storage capacitors is applied to forward transformer 426 which will cause the current in output filter ($i_{Lo}$ in FIG. 4b) to linearly increase.

Period 2 ($t_1$~$t_2$): the main switch is turned off at $t_1$, the flyboost transformer discharges through its secondary winding and delivers stored magnetizing energy to the load. The current in the flyboost transformer secondary winding ($i_{D1}$) decreases linearly as does the current in output filter ($i_{Lo}$). The forward transformer 426 will demagnetize through the storage capacitors.

At $t_2$, all magnetizing energy in the flyboost transformer is transferred to the load, the current in the flyboost transformer secondary winding ($i_{D1}$) reaches zero and the block diode 438 will prevent the current from going to negative. And the current in output filter ($i_{Lo}$) continues to decrease until it reaches zero at $t_3$. The switch is turned on at $t_4$ and a new cycle will begin.

Boost mode (FIG. 4c): when line voltage is higher than 2 times Vcs minus Vo divided by n1, the flyboost power factor correction cell works as boost inductor. During the switch on period, the current in flyboost transformer will increase linearly, then decrease and transfer power to storage capacitors during the switch off period. The parallel/series forward cell will deliver all required power to the load to minimize the output voltage ripple.

Period 1 ($t_o$~$t_1$): the main switch is turned on at $t_o$, the line voltage is applied to flyboost transformer. The current in the primary winding of flyboost transformer, $i_1$ in FIG. 4c, will increase linearly. And the voltage across storage capacitors is applied to forward transformer 426, which will cause the current in output filter ($i_{Lo}$ in FIG. 4c) to linearly increase.

Period 2 ($t_1$~$t_2$): the main switch is turned off at $t_1$, the current in the flyboost ($i_1$) will decrease linearly and discharge energy to storage capacitors. And the current in output filter ($i_{Lo}$) will linearly decrease also. The forward transformer 426 will demagnetize through two storage capacitors.

At $t_2$, the current in the flyboost ($i_1$) reaches zero. And the current in output filter ($i_{Lo}$) continues to decrease until it reaches zero at $t_3$. The switch is turned on at $t_4$ and a new cycle will begin.

By designing the turn ratio of flyboost transformer 114, the DC bus voltage across bus capacitor 130 in FIG. 2 is controlled. When the DC bus voltage is too high, more energy will be discharged to output through flyback mode. When the DC bus voltage is too low, more energy will be transferred to storage capacitor through boost mode. So the flyboost cell can automatically control the DC bus voltage. It makes the invention suitable for universal line voltage application. Since the load change will not affect the DC bus voltage, the invention can let the DC/DC converter cell at continuous conduction mode (CCM). At CCM, the current stress in power components is low, and efficiency is improved.

Experimental Results

An experimental unit is described hereafter to fully illustrate the invention. The prototype was built according to schematic diagram shown in FIG. 3c, where there is combined a flyboost PFC cell and a parallel/series forward cell. The design specifications were:

Minimum line voltage: approximately 85VAC
Maximum line voltage: approximately 265VAC
Nominal line voltage: approximately 110VAC
Output voltage: approximately 28VDC
Output power rating: approximately 150W Power factor is a very important parameter for PFC circuit. It shows the harmonic distortion content and phase displacement in the line current. Power factor should be close to about 1 for a good result. HP 6841A harmonic/flicker test system can directly display the testing result. All following data are read from that equipment.

Figure 5:
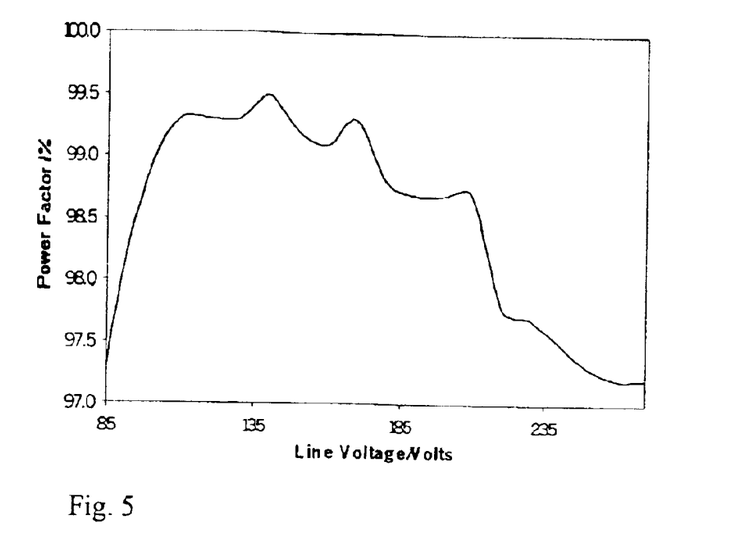
FIG. 5 shows measured power factor vs. line voltage.
Figure 6:
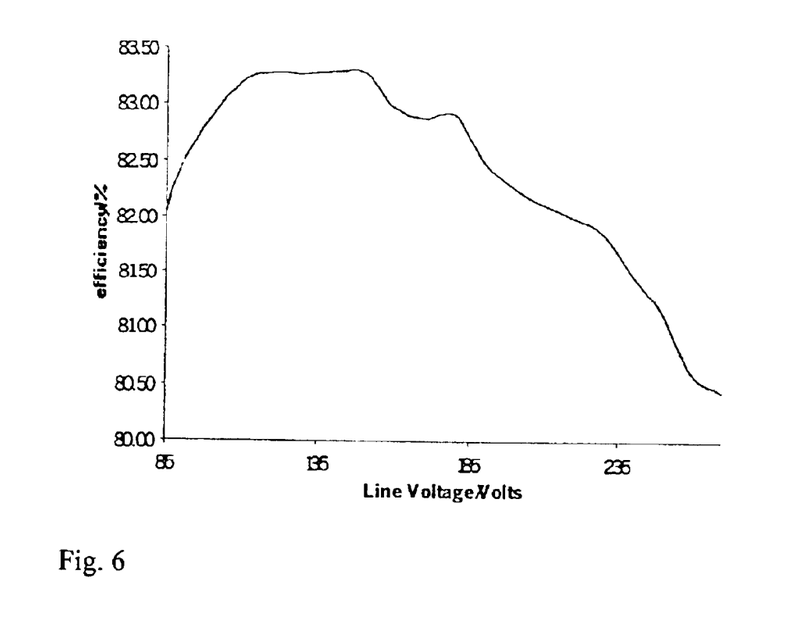
FIG. 6 shows measured efficiency vs. line voltage.
Figure 7:
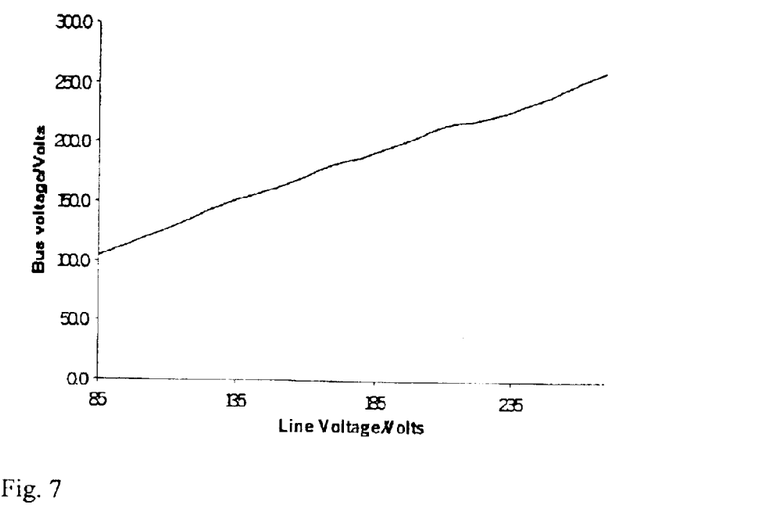
FIG. 7 shows measured storage capacitor voltage (Vs) vs. line voltage.
Figure 8:
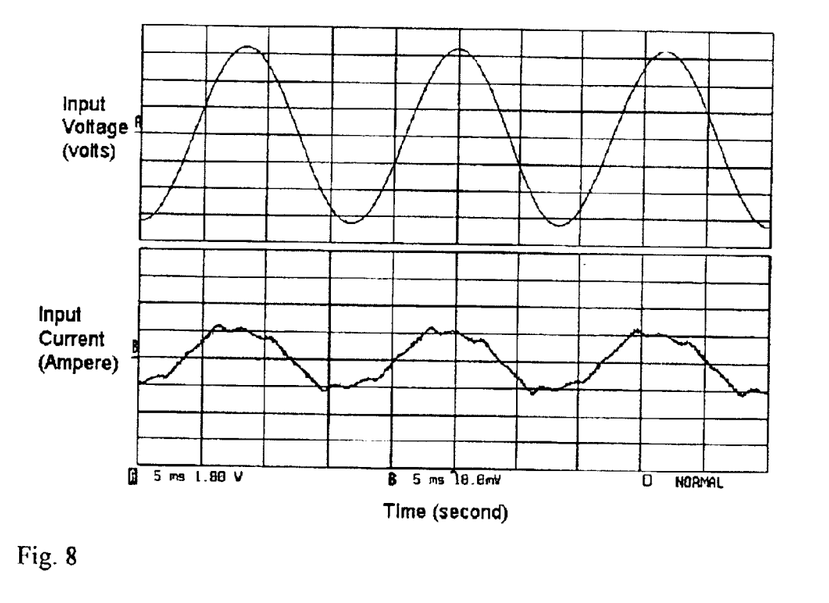
FIG. 8 shows line voltage and line current at line voltage of approximately 230 VAC.
Figure 9:
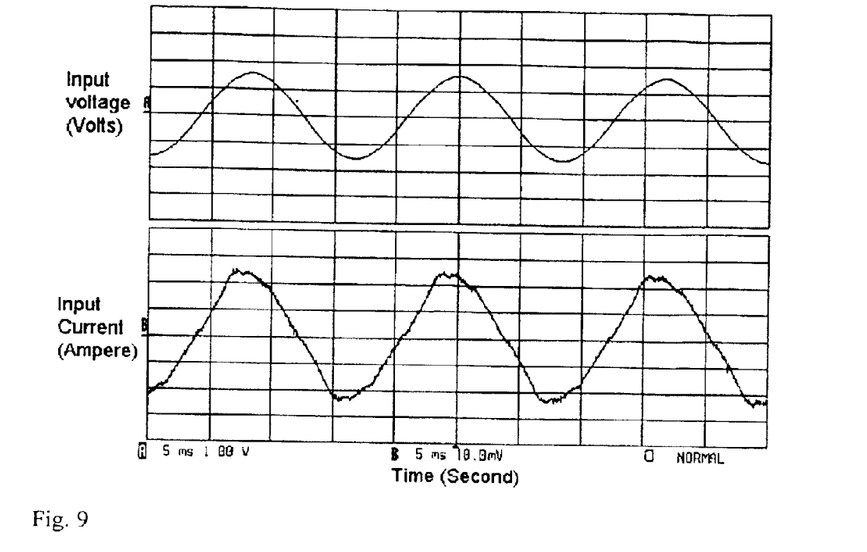
FIG. 9 shows line voltage and line current at line voltage of approximately 110 VAC.
Figure 10:
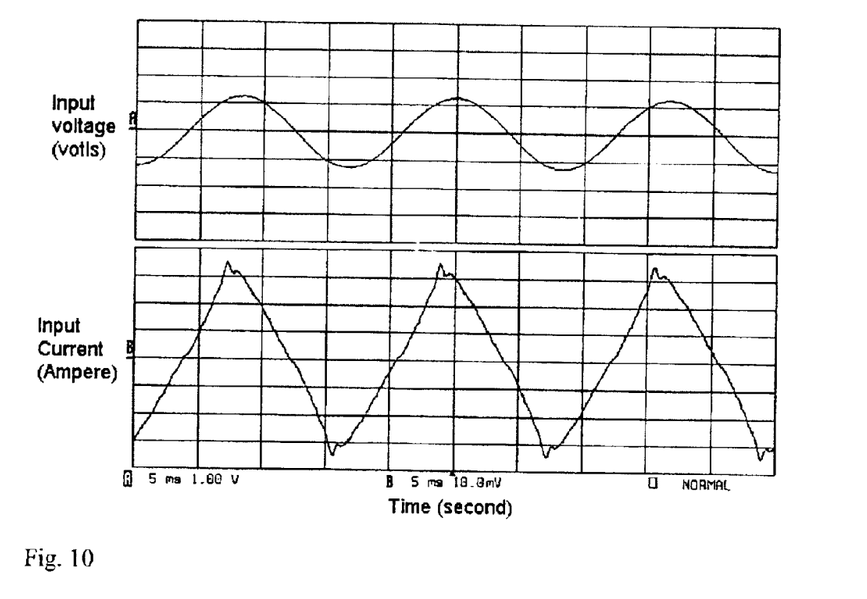
FIG. 10 shows line voltage and line current at line voltage of approximately 90 VAC.

FIGS. 5–10 show the prototype developed experimental results and measured waveforms, respectively. Refer to FIG. 5, which data shows the measured power factor vs. line voltage, with all results higher than 0.97, which means that it meets the standard requirement; FIG. 6 shows measured efficiency vs. line voltage, which are always higher than approximately 80%; while for conventional single stage PFC schemes, it is very difficult to achieve this high value; FIG. 7 shows measured storage capacitor voltage (Vs) vs. line voltage, the maximum voltage is about 260V, resulting in about 520V bus voltage, comparing to around 700V bus voltage in other single stage PFC scheme; FIG. 8 shows line voltage and line current where the line voltage is about 230 VAC; FIG. 9 shows line voltage and line current where the line voltage is approximately 110 VAC; and, FIG. 10 shows line voltage and line current where the line voltage is approximately 90 VAC. All those current waveforms are close to sinusoidal waveform, resulting in high power factor.

Based on those experimental results, the invention provides better power factor, higher efficiency, and lower bus voltage. All those improvement are very important for single stage PFC scheme. The inventive approach is better than other known single stage PFC schemes.

In summary of the internal action of the inventive cell, the power transferred by flyback mode is directly delivered to output while the power transferred by boost mode is stored in storage capacitor and then delivered to output. So the power transferred by flyback mode is processed by main switch only once while the power transferred by the known boost mode is processed by the main switch twice. Some power will be lost during each power process. Since some power is transferred directly by flyback mode, the efficiency is improved compared to prior schemes.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A power factor correction (PFC) alternating current to direct current (AC/DC) converter comprising:
   (a) a power factor correction cell having an AC input, a switch, a DC output and a flyboost transformer having a plurality of windings;
   (b) a Direct current to direct current (DC/DC) converter cell having both DC input terminals and DC output terminals; and,
   (c) means for operating the power factor correction cell (PFC) as a flyback transformer in a flyback mode and as a boosting device in a boost mode as a function of the magnitude of the input voltage to the power factor correction cell whereby the converter has an improved power factor correction.

2. The power factor correction AC/DC converter according to claim 1 wherein said power factor correction cell has two discharging paths, a first discharging path to a DC bus storage capacitor and a second discharging path to the output.

3. The power factor correction AC/DC converter according to claim 1 wherein said power factor correction cell transfers a portion of its power directly to said DC output terminals.

4. The power factor correction AC/DC converter according to claim 1 wherein said the DC/DC converter cell has means providing for operation at both discontinuous conduction mode (DCM) or continuous conduction mode (CCM) without voltage trouble at a selected load condition.

5. The power factor correction AC/DC converter according to claim 1 wherein said DC/DC converter cell is a flyback DC/DC converter cell.

6. The power factor correction AC/DC converter according to claim 1 wherein said DC/DC converter cell is a forward DC/DC converter cell.

7. The power factor correction AC/DC converter according to claim 1 wherein said DC/DC converter cell is a parallel/series forward DC/DC converter cell.

8. The power factor correction AC/DC converter according to claim 1 wherein said DC/DC converter cell is a parallel/series flyback DC/DC converter cell.

9. The power factor correction AC/DC converter according to claim 1 wherein said DC/DC converter cell is a half bridge DC/DC converter cell.

10. The power factor correction AC/DC converter according to claim 1 wherein said DC/DC converter cell is a two switches flyback DC/DC converter cell.

11. The power factor correction AC/DC converter according to claim 1 wherein said DC/DC converter cell is a two switches forward DC/DC converter cell.

12. A power factor correction AC/DC converter comprising:
   i. a power factor correction cell having a flyboost transformer and a plurality of discharge paths; and,
   ii. means for automatically controlling distributed power through the different discharging paths thereby limiting DC bus voltage, by operating the flyboost transformer as a flyback transformer in a flyback mode and as a boosting device in a boost mode, depending upon input voltage to the power factor correction cell.

13. A method for improving an alternating current to direct current (AC/DC) mode power supply with power factor correction (PFC) comprising the steps of:
   (i) inputting voltage to a power factor correction cell (PFC) having a flyboost transformer and a DC output; and
   (ii) operating the flyboost transformer as a flyback transformer in a flyback mode and as a boosting device in a boost mode, depending upon a function of the magnitude of the input voltage to the power factor correction cell.

14. The method of claim 13, further providing the step of:
   providing a first discharging path from the power factor correction cell (PFC) to a DC bus storage capacitor; and providing a second discharging path to the DC output of the power factor correction cell (PFC).

15. The method of claim 13, further comprising the step of:

combining the flyboost transformer with a DC/DC conversion cell having both DC input terminals and DC output terminals, in order to share a single switch and a single controller.

16. The method of claim 15, further comprising the step of:

transferring a portion of power from the power correction cell (PFC) directly to said DC output terminals.

17. The method of claim 15, further comprising the step of:

operating the DC/DC conversion cell at a discontinuous conduction mode (DCM) and at a continuous conduction mode (CCM) without voltage trouble at a selected load.

* * * * *